(12) United States Patent
Cevik et al.

(10) Patent No.: US 12,665,211 B2
(45) Date of Patent: Jun. 23, 2026

(54) BOLT FASTENED FUEL ASSEMBLY FOR BIOFUELS

(71) Applicant: Imam Abdulrahman Bin Faisal University, Dammam (SA)

(72) Inventors: Emre Cevik, Dammam (SA); Ismail Anil, Dammam (SA); Omer Aga, Dammam (SA); Mehmet Senel, Istanbul (TR)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 19/378,409

(22) Filed: Nov. 4, 2025

(65) Prior Publication Data

US 2026/0066323 A1 Mar. 5, 2026

Related U.S. Application Data

(63) Continuation of application No. 19/279,676, filed on Jul. 24, 2025, now Pat. No. 12,494,500, which is a
(Continued)

(51) Int. Cl.
*H01M 8/16* (2006.01)
*H01M 4/86* (2006.01)
(Continued)

(52) U.S. Cl.
CPC ........... *H01M 8/16* (2013.01); *H01M 4/9016* (2013.01); *H01M 4/92* (2013.01); *H01M 4/96* (2013.01);
(Continued)

(58) Field of Classification Search
CPC ........ H01M 8/16; H01M 4/9016; H01M 4/92; H01M 4/96; H01M 8/02; H01M 2004/8684; H01M 2004/8689; H01M 2250/30
See application file for complete search history.

(56) References Cited

U.S. PATENT DOCUMENTS 8,415,059 B2  4/2013  Minteer et al.
2010/0304458 A1* 12/2010  Bombelli ............ H01M 8/1023
435/292.1
(Continued)

FOREIGN PATENT DOCUMENTS

CN      108011121 B      7/2020
KR      10-2076264 B1    2/2020
WO      2007/121246 A2   10/2007

OTHER PUBLICATIONS

Cevik, et al. ; Direct electricity production from Microalgae *Choricystis* sp. And investigation of the boron to enhance the electrogenic activity ; International Journal of Hydrogen Energy, vol. 45, Issue 19 ; Apr. 3, 2020 ; Abstract Only ; 4 Pages.
(Continued)

*Primary Examiner* — Karie O'Neill Apicella
(74) *Attorney, Agent, or Firm* — Oblon, McClelland, Maier & Neustadt, L.L.P.

(57) ABSTRACT

A bio-electrochemical fuel cell is provided. The fuel cell includes an anode placed between a second endplate and a supporting plate, a cathode placed between a first endplate and the supporting plate, a separator plate provided between the first endplate and the cathode, a separator plate provided between the second endplate and the anode, and at least one separator plate provided on each side of the supporting plate. The anode has a first layer and a biofilm including photosynthetic microorganisms is present on a surface of the first layer. A central aperture of the first endplate receives a flow of water containing the photosynthetic microorganisms and a central aperture of the second endplate discharges the flow of water. Application of light to the fuel cell assembly causes the photosynthetic microorganisms to release oxygen at the anode and induces a photo-current in the anode.

10 Claims, 3 Drawing Sheets

Related U.S. Application Data continuation of application No. 17/939,504, filed on Sep. 7, 2022, now Pat. No. 12,482,842.

(51) Int. Cl.

| | |
|---|---|
| *H01M 4/90* | (2006.01) |
| *H01M 4/92* | (2006.01) |
| *H01M 4/96* | (2006.01) |
| *H01M 8/02* | (2016.01) |

(52) U.S. Cl.

CPC ...... *H01M 8/02* (2013.01); *H01M 2004/8684* (2013.01); *H01M 2004/8689* (2013.01); *H01M 2250/30* (2013.01)

(56) References Cited

U.S. PATENT DOCUMENTS

| | | |
|---|---|---|
| 2011/0171496 A1 | 7/2011 | Noguera et al. |
| 2012/0292187 A1* | 11/2012 | Kim ...................... B01D 61/44 |
| | | 204/527 |
| 2018/0048010 A1 | 2/2018 | Shechter |

OTHER PUBLICATIONS

Bobrowski, et al. ; Rechargeable, flexible and mediator-free biosupercapacitor based on transparent ITO nanoparticle modified electrodes acting in mu M glucose containing buffers ; Biosensors and Bioelectronics, vol. 101 ; Mar. 15, 2018 ; Abstract Only ; 4 Pages.

Reid, et al. ; Contact lens biofuel cell tested in a synthetic tear solution ; Biosensors and Bioelectronics, vol. 68 ; Jun. 15, 2015 ; Abstract Only ; 3 Pages.

\* cited by examiner

BOLT FASTENED FUEL ASSEMBLY FOR BIOFUELS

CROSS-REFERENCE TO RELATED APPLICATIONS

The present application is a Continuation of U.S. application Ser. No. 19/279,676, now allowed, having a filing date of Jul. 24, 2025 which is a Continuation of U.S. application Ser. No. 17/939,504, now allowed, having a filing date of Sep. 7, 2022.

BACKGROUND

Technical Field

The present disclosure is directed to a cell, and particularly to a bio-electrochemical fuel cell.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A biofuel cell is an electrochemical device in which energy derived from chemical reactions is converted to electrical energy by means of catalytic activities of living cells or by corresponding enzymes. A bioanode is the electrode of the biofuel cell where electrons are released upon the oxidation of a fuel and a biocathode is the electrode where electrons and protons from the anode are used by the catalyst to reduce oxygen to water. Biofuel cells differ from a traditional fuel cell by a material used to catalyze an electrochemical reaction. Rather than using metals as catalysts, biofuel cells use biological molecules such as enzymes to carry out the electrochemical reaction.

However, biofuel cells generally use complex molecules to generate the hydrogen ions required to reduce oxygen to water, while generating free electrons for use in electrical applications. Furthermore, current biofuel cells are complex and economically inefficient. Hence, an efficient biofuel cell needs to be developed, which may substantially reduce or eliminate the aforementioned limitations.

In view of the forgoing, one objective of the present disclosure is to provide a bio-electrochemical fuel cell using photosynthetic microorganisms and having a hexagonal planar structure with a cylindrical reaction chamber in the center. The fuel cell maybe used in a wearable electronic device as a battery.

SUMMARY

In an exemplary embodiment, a bio-electrochemical fuel cell is described. The fuel cell includes an anode, a cathode, a first endplate including a central aperture. The fuel cell further includes a second endplate opposite the first endplate. The second endplate includes a central aperture. The fuel cell further includes a supporting plate between the first endplate and the second endplate. The supporting plate includes a central aperture. The fuel cell further includes at least one separator plate provided between the first endplate and the cathode. The fuel cell further includes at least one separator plate provided between the second endplate and the anode. The fuel cell further includes at least one separator plate provided on each side of the supporting plate. The anode is placed between the second endplate and the supporting plate. The cathode is placed between the first endplate and the supporting plate. The anode has a first layer including at least one selected from the group consisting of superoxide dismutase and catalase enzyme. A biofilm including photosynthetic microorganisms is present on a surface of the first layer of the anode. The anode, the cathode, the first endplate, the supporting plate, the second endplate and the separator plates are connected together to form a fuel cell assembly. The central aperture of the first endplate receives a flow of water containing the photosynthetic microorganisms. The central aperture of the second endplate discharges the flow of water. Application of light to the fuel cell assembly causes the photosynthetic microorganisms to release oxygen at the anode and induces a photo-current in the anode.

In some embodiments, the fuel cell has a planar structure.

In some embodiments, the fuel cell has a hexagonal shape, a reaction chamber having an average interior diameter in a range of 6-200 cm, and an average exterior diameter in a range of 10-400 cm.

In some embodiments, the reaction chamber has an average interior diameter in a range of 6-150 cm and an average exterior diameter in a range of 10-300 cm.

In some embodiments, the separator plate is a transparent silicone rubber gasket material.

In some embodiments, the anode includes a conductive transparent glass coated with at least one selected from the group consisting of tin oxide, indium tin oxide, titanium dioxide, and mixtures thereof.

In some embodiments, the anode includes a conductive transparent glass coated with the indium tin oxide.

In some embodiments, the cathode includes a carbon material or platinum.

In some embodiments, the carbon material is at least one selected from the group consisting of activated carbon, reduced graphene oxide, graphite, carbon felt, carbon foam, carbon paper, carbon brush, carbon cloth, carbon black, carbon powder, carbon nanofibers, carbon fiber, single-walled carbon nanotubes, double-walled carbon nanotubes, multi-walled carbon nanotubes, carbon nanotube arrays, diamond-coated conductors, glass carbon, mesoporous carbon, uncompressed graphite worms, delaminated purified flake graphite, polycrystalline graphite, and pyrolytic graphite.

In some embodiments, the cathode includes at least one enzyme selected from the group consisting of laccase, cytochrome C oxidase, superoxide dismutase, bilirubin oxidase, and peroxidase.

In some embodiments, the cathode has a layer of bilirubin oxidase.

In some embodiments, the photosynthetic microorganism is at least one selected from the group consisting of a diatom, a phytoplankton, green algae, cyanobacteria, and green sulfur bacteria.

In some embodiments, the photosynthetic microorganisms are green algae and cyanobacteria.

In some embodiments, a wearable device includes the fuel cell, in which the fuel cell is electrically connected to a sensor and functions as a battery.

In some embodiments, a light-emitting diode device includes the fuel cell, in which the fuel cell is electrically connected to a light-emitting diode and functions as a battery.

In some embodiments, a fuel cell assembly includes 2 to 10 of the fuel cells which are connected in parallel and/or in series.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
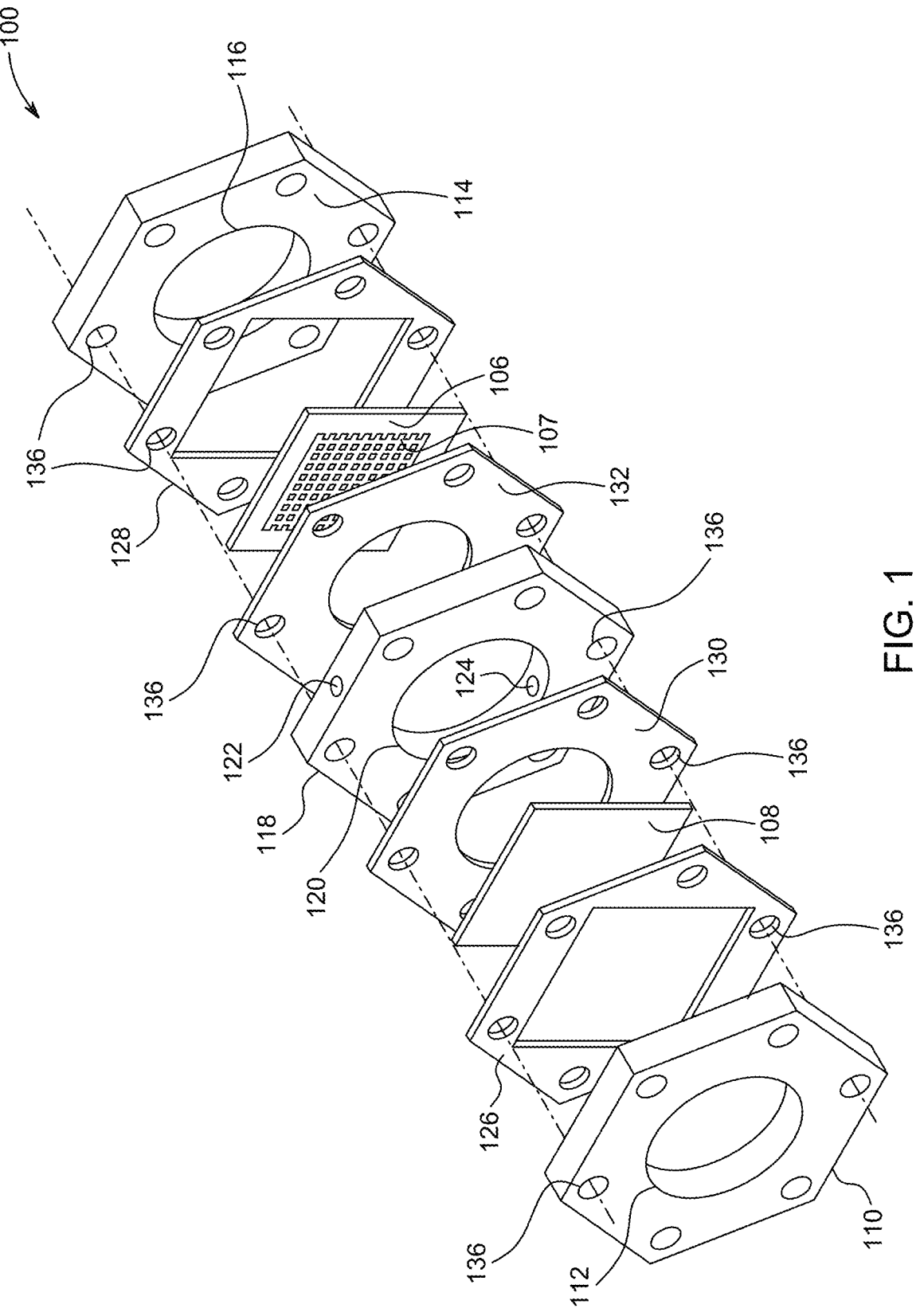
FIG. 1 is an exploded view of a bio-electrochemical fuel cell, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

According to a first aspect, the present disclosure relates to a bio-electrochemical fuel cell, which includes an anode with a layer of enzymes and a biofilm with photosynthetic microorganisms present on a surface of the layer of the anode.

In an embodiment, the bio-electrochemical fuel cell comprises an anode, a cathode, a first endplate including a central aperture, a second endplate opposite the first endplate, the second endplate including a central aperture, a supporting plate between the first endplate and the second endplate, and the supporting plate including a central aperture.

At least one separator plate is provided between the first endplate and the cathode. At least one separator plate is provided between the second endplate and the anode. At least one separator plate is provided on each side of the supporting plate. The anode is preferably disposed between the second endplate and the supporting plate and the cathode is preferably disposed between the first endplate and the supporting plate.

The anode comprises an electron conductor, at least one anode enzyme, and an enzyme immobilization material. The electron conductor is a substance that conducts electrons. The anode enzyme is capable of reacting with a fuel fluid to produce an oxidized form of the fuel fluid, and capable of releasing electrons to the electron conductor. The enzyme immobilization material is capable of immobilizing and stabilizing the enzyme and is permeable to the fuel fluid.

The electron conductor can be organic or inorganic in nature as long as it is able to conduct electrons through the material. The electron conductor can be a carbon-based material, stainless steel, stainless steel mesh, a metallic conductor, a semiconductor, a metal oxide, or a modified conductor. In preferred embodiments, the electron conductor is a carbon based material. Particularly suitable electron conductors are carbon-based materials. Exemplary carbon-based materials are carbon cloth, carbon paper, carbon screen printed electrodes, carbon paper (Toray), carbon paper (ELAT), carbon black (Vulcan XC-72, E-tek), carbon black, carbon powder, carbon fiber, single-walled carbon nanotubes, double-walled carbon nanotubes, multi-walled carbon nanotubes, carbon nanotubes arrays, diamond-coated conductors, glassy carbon and mesoporous carbon. In addition, other exemplary carbon-based materials are graphite, uncompressed graphite worms, delaminated purified flake graphite (Superior® graphite), high performance graphite and carbon powders (Formula BTTM, Superior® graphite), highly ordered pyrolytic graphite, pyrolytic graphite and polycrystalline graphite. A preferred electron conductor (Support membrane) is a sheet of carbon cloth. In a further embodiment, the electron conductor can be made of a metallic conductor. Suitable electron conductors can be prepared from gold, platinum, iron, nickel, copper, silver, stainless steel, mercury, tungsten, and other metals suitable for electrode construction. In addition, electron conductors which are metallic conductors can be constructed of nanoparticles made of cobalt, carbon, and other suitable metals. Other metallic electron conductors can be silver-plated nickel screen printed electrodes.

In addition, the electron conductor can be a semiconductor. Suitable semiconductor materials include silicon and germanium, which can be doped with other elements. The semiconductors can be doped with phosphorus, boron, gallium, arsenic, indium or antimony, or a combination thereof. Other electron conductors can be metal oxides, metal sulfides, main group compounds (i.e., transition metal compounds), and materials modified with electron conductors.

Exemplary electron conductors of this type are nanoporous titanium oxide, tin oxide coated glass, cerium oxide particles, molybdenum sulfide, boron nitride nanotubes, aerogels modified with a conductive material such as carbon, solgels modified with conductive material such as carbon, ruthenium carbon aerogels, and mesoporous silicas modified with a conductive material such as carbon. In various preferred embodiments, the electron conductor is a carbon cloth, a carbon nanotube, an expanded graphite worm, a carbon paste, and combinations thereof. More preferably, the electron conductor is a carbon nanotube.

In an embodiment, the anode has a first layer comprising at least one selected from the group consisting of superoxide dismutase and catalase enzyme.

An enzyme immobilization material is utilized in the biofuel cell at the bioanode and/or the biocathode. In one embodiment, the bioanode's enzyme immobilization material is permeable to the fuel fluid and immobilizes and stabilizes the enzyme. The immobilization material is permeable to the fuel fluid so the oxidation reaction of the fuel at the bioanode can be catalyzed by the immobilized enzyme.

An immobilized enzyme is an enzyme that is physically confined in a certain region of the enzyme immobilization material while retaining its catalytic activity. There are a variety of methods for enzyme immobilization, including carrier-binding, cross-linking and entrapping.

Carrier-binding is the binding of enzymes to water-insoluble carriers. Cross-linking is the intermolecular cross-linking of enzymes by bifunctional or multifunctional reagents. Entrapping is incorporating enzymes into the lattices of a semipermeable material. The particular method of enzyme immobilization is not critically important, so long as the enzyme immobilization material (1) immobilizes the enzyme, (2) stabilizes the enzyme, and (3) is permeable to the fuel fluid or oxidant.

With reference to the enzyme immobilization materials permeability to the fuel fluid or oxidant and the immobilization of the enzyme, in various embodiments, the material is permeable to a compound that is smaller than an enzyme. Stated another way, the enzyme immobilization material allows the movement of the fuel fluid or oxidant compound through it so the compound can contact the enzyme. The enzyme immobilization material can be prepared in a manner such that it contains internal pores, channels, openings or a combination thereof, which allow the movement of the compound throughout the enzyme immobilization material, but which constrain the enzyme to substantially the same space within the enzyme immobilization material. Such constraint allows the enzyme to retain its catalytic activity. In various preferred embodiments, the enzyme is confined to a space that is substantially the same size and shape as the enzyme, wherein the enzyme retains substantially all of its catalytic activity. The pores, channels, or openings have physical dimensions that satisfy the above requirements and depend on the size and shape of the specific enzyme to be immobilized.

In various embodiments, the enzyme is preferably located within a pore of the enzyme immobilization material and the compound travels in and out of the enzyme immobilization material through transport channels. The relative size of the pores and transport channels can be such that a pore is large enough to immobilize an enzyme, but the transport channels are too small for the enzyme to travel through them. Further, a transport channel preferably has a diameter of at least about 10 nm. In still another embodiment, the pore diameter to transport channel diameter ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1. 9.5:1, 10:1 or more. In yet another embodiment, preferably, a transport channel has a diameter of at least about 10 nm and the pore diameter to transport channel diameter ratio is at least about 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1 or more. In one embodiment, the immobilization material, preferably, stabilizes the enzyme so that the enzyme retains its catalytic activity for at least about 7 days to about 730 days. The retention of catalytic activity is defined by the number of days that the enzyme retains at least about 75% of its initial activity while continually producing electricity as part of a biofuel cell. In other embodiments, preferably, the immobilized enzyme retains at least about 75% of its initial catalytic activity for at least about 5, 10, 15, 20, 25, 30, 45, 60, 75, 90, 105, 120, 150, 180, 210, 240, 270, 300, 330, 365, 400, 450, 500, 550, 600, 650, 700, 730 days or more, preferably retaining at least about 80%, 85%, 90%, 95% or more of its initial catalytic activity for at least about 5, 10, 15, 20, 25, 30, 45, 60, 75, 90, 105, 120, 150, 180, 210, 240, 270, 300, 330, 365, 400, 450, 500, 550, 600, 650, 700, 730 days or more. In some of the embodiments, the enzyme immobilization material has a micellar or inverted micellar structure. Generally, the molecules making up a micelle are amphipathic, meaning they contain a polar, hydrophilic group and a non polar, hydrophobic group. The molecules can aggregate to form a micelle, where the polar groups are on the surface of the aggregate and the hydrocarbon, nonpolar groups are sequestered inside the aggregate. Inverted micelles have the opposite orientation of polar groups and nonpolar groups.

The amphipathic molecules making up the aggregate can be arranged in a variety of ways so long as the polar groups are in proximity to each other, and the nonpolar groups are in proximity to each other. Also, the molecules can form a bilayer with the nonpolar groups pointing toward each other and the polar groups pointing away from each other. Alternatively, a bilayer can form wherein the polar groups can point toward each other in the bilayer, while the nonpolar groups point away from each other. Exemplary micellar or inverted micellar enzyme immobilization materials are, hydrophobically modified polysaccharides, these polysaccharides are selected from chitosan, collagen, carrageenans, agarose, cellulose, chitin, starch, amylose, alginate, and combinations thereof. In various embodiments, the micellar or inverted micellar enzyme immobilization materials are polycationic polymers, particularly, hydrophobically modified chitosan.

In an embodiment, a biofilm comprising photosynthetic microorganisms is present on a surface of the first layer of the anode.

In an embodiment, the anode, the cathode, the first endplate, the supporting plate, the second endplate and the separator plates are connected together to form a fuel cell assembly.

In an embodiment, the central aperture of the first endplate receives a flow of water containing the photosynthetic microorganisms and the central aperture of the second endplate discharges the flow of water.

In an embodiment, application of light to the fuel cell assembly causes the photosynthetic microorganisms to release oxygen at the anode and induces a photo-current in the anode.

In an embodiment, the fuel cell has a planar structure, for example the fuel cell is flat and has a hexagonal form.

In some embodiments, the fuel cell has a reaction chamber having an average interior diameter in a range of 6-200 cm, preferably 6-150 cm, preferably 6-130 cm, preferably 6-100 cm, preferably 6-80 cm, and an average exterior diameter in a range of 10-400 cm, preferably 10-350 cm, preferably 10-330 cm, preferably 10-300 cm, preferably 10-250 cm, preferably 10-200 cm, preferably 10-150 cm, preferably 10-120 cm, preferably 10-100 cm.

In some embodiments, the reaction chamber has an average interior diameter in a range of 6-150 cm, preferably 6-70 cm, preferably 6-65 cm, preferably 6-60 cm, preferably 6-55 cm, preferably 6-50 cm, preferably 6-45 cm, preferably 6-40 cm, preferably 6-35 cm, preferably 6-30 cm, preferably 6-25 cm, preferably 6-20 cm, and an average exterior diameter in a range of 10-300 cm, preferably 10-80 cm, preferably 10-70 cm, preferably 10-65 cm, preferably 10-60 cm, preferably 10-55 cm, preferably 10-50 cm, preferably 10-45 cm, preferably 10-40 cm, preferably 10-35 cm.

The reaction chamber can have a volume of at least 1 mL to 1 L or more, preferably at least 10 mL to 1 L or more, preferably 50 mL to 1 L or more.

In an embodiment, the separator plate is a transparent silicone rubber gasket material. The transparent silicone rubber gasket material comprises polydimethylsiloxane or polydiethylsiloxane. The silicone rubber gasket material may have an average thickness in a range of 1.5 to 10 mm, preferably 1.5 to 8 mm, preferably 1.5 to 6 mm, preferably 1.5 to 4 mm.

FIG. 1 illustrates an exploded view of a bio-electrochemical fuel cell 100. In some embodiments, the fuel cell 100 has a planar structure. Hence, the planar structure of the fuel cell 100 provides an efficient and a simple assembling of the fuel cell 100. In some embodiments, the fuel cell 100 may have a non-planar structure. In some embodiments, an outside of the fuel cell 100 has a hexagon structure. In some embodiments, the outside of the fuel cell 100 may have, but are not limited to, a circular structure, an oval structure, a triangular structure, and any other polygonal structures known in the art. In some embodiments, the fuel cell 100 may be made of materials including, but not limited to, one or more of a glass, a quartz, a plastic, copper, aluminum, nickel, iron, and steel. In some embodiments, the fuel cell 100 may be manufactured using a three-dimensional (3D) printing process.

The fuel cell 100 includes an anode 106. The anode 106 has a first layer 107 including at least one selected from the group consisting of superoxide dismutase and catalase enzyme. A biofilm including photosynthetic microorganisms is present on a surface of the first layer 107 of the anode 106.

In an embodiment, photosynthetic microorganisms are at least one selected from the group consisting of as a diatom, a phytoplankton, green algae, cyanobacteria, and green sulfur bacteria, rhodospirillaceae, acetobacteraceae, bradyrhizobiaceae, hyphomicrobiaceae, rhodobiaceae, rhodobacteraceae, rhodocyclaceae, and comamonadaceae.

In an embodiment, the photosynthetic microorganisms are green algae and cyanobacteria.

In some embodiments, the anode 106 includes a conductive transparent glass coated with at least one selected from the group consisting of tin oxide, indium tin oxide, titanium dioxide, fluorine doped tin oxide, aluminum-doped zinc oxide, gallium-doped zinc oxide, indium zinc oxide, indium zinc tin oxide, indium aluminum zinc oxide, indium gallium zinc oxide, indium gallium tin oxide, antimony tin oxide, and mixtures thereof. In an embodiment, the anode comprises a conductive transparent glass coated with the indium tin oxide. The conductive transparent glass is placed adjacent to the second end of the fuel cell assembly. Light enters the fuel cell assembly through one or both ends of the cell. The anode 106 includes high light transparent capacity. As used herein, the term 'light transparent capacity' refers to an ability possessed by a material to allow the incident light rays to pass through the material. The first layer 107 that is present on the anode 106, and is preferably directly adjacent and in physical contact with the anode 106, functions to hold an enzyme such as a superoxide dismutase and/or a catalase. The layer 107 is preferably a substrate on which the enzyme is chemically or physically connected. Preferably the enzyme is chemically connected to the substrate by, for example, an ionic or covalent bond. Covalent bonding between the substrate and the enzyme may occur through one or more linker units such as —NH—, —COH—, —S—, —CO—, —CH₂—, etc. The substrate on which the enzyme is bonded can be organic or inorganic. Preferably the substrate is a transparent or at least partially transparent polymeric material onto which the enzyme can be grafted through the linker. Preferably the substrate of the first layer 107 is a mesh or grid of woven organic material. The mesh or grid provides a three-dimensional surface onto which the enzyme can be connected. In other embodiments the substrate of the first layer 107 is a low density porous foam or porous membrane.

The fuel cell 100 includes a cathode 108. In some embodiments, the cathode 108 includes a carbon material or platinum. In some embodiments, the carbon material is at least one selected from the group consisting of activated carbon, reduced graphene oxide, graphite, carbon felt, carbon foam, carbon paper, carbon brush, carbon cloth, carbon black, carbon powder, carbon nanofibers, carbon fiber, single-walled carbon nanotubes, double-walled carbon nanotubes, multi-walled carbon nanotubes, carbon nanotube arrays, diamond-coated conductors, glass carbon, mesoporous carbon, uncompressed graphite worms, delaminated purified flake graphite, polycrystalline graphite, and pyrolytic graphite. In some embodiments, the carbon material may include, but is not limited to carbon screen printed electrode, high performance graphite, and highly ordered pyrolytic graphite.

The cathode comprises an electron conductor, at least one cathode enzyme, and an enzyme immobilization material. The electron conductor may be any of those described previously for the electron conductor of the anode and the enzyme immobilization material may be any of those described previously for the anode. The cathode enzyme is capable of reacting with an oxidant to produce water, and capable of gaining electrons from the electron conductor. In some embodiments, the cathode 108 includes at least one enzyme selected from the group consisting of laccase, cytochrome C oxidase, superoxide dismutase, bilirubin oxidase, and peroxidase. In some embodiments, the cathode 108 has a layer of bilirubin oxidase. In some embodiments, the fuel cell 100 may include one or more ion selective membranes which may act as separation membranes between the anode 106 and the cathode 108. In some embodiments, the fuel cell 100 may not include a separation membrane between the anode 106 and the cathode 108.

The fuel cell 100 includes a first endplate 110 including a central aperture 112. The fuel cell 100 further includes a second endplate 114 opposite the first endplate 110. The second endplate 114 also includes a central aperture 116. Furthermore, the central aperture 116 of the second endplate 114 is allowed to provide high light penetration into the fuel cell 100. In some embodiments, the first and second endplates 110, 114 may include lids. In some embodiments, the lids may be hinged, pivoted, snap-fitted to the first and second endplates 110, 114. The fuel cell 100 further includes a supporting plate 118 between the first endplate 110 and the second endplate 114. The supporting plate 118 includes a central aperture 120. The supporting plate 118 includes an inlet 122 and an outlet 124. The supporting plate 118 is configured to receive a fluid including the photosynthetic microorganisms and nutrients such as agar-agar, via the inlet 122. The supporting plate 118 is configured to receive the fluid via a hose coupled to the inlet 122. In some embodiments, a pumping device may be used to pump the fluid including the photosynthetic microorganisms into the fuel cell 100. The supporting plate 118 is configured to release the fluid via the outlet 124. The outlet 124 may be connected with a conduit to discharge the fluid in a container which may be kept near the outlet 124. The fluid is preferably provided in a continuous circulation to use the photosynthetic microorganisms for a longer duration to produce electricity at high efficiency. Parameters such as flow rate, pH, temperature, and concentrations of the fluid are essential for generating electricity. For instance, a power flow may be increased by decreasing the flow velocity of the fluid. The fuel cell 100 further includes at least one separator plate 126 provided between the first endplate 110 and the cathode 108. The fuel cell 100 further includes at least one separator plate 128 provided between the second endplate 114 and the anode 106.

In some embodiments, the central apertures 112, 116, 120 may be a rhombic shape, a rectangular shape, an oval shape, or a squarish shape. A reaction chamber is a volume defined by internal walls of the fuel cell 100. Hereinafter, the central apertures 112, 116, 120 of the first end plate 110, the second end plate 114, and the supporting plate 118, respectively, together define a 'reaction chamber' 129 (shown in FIG. 2), which is located in the center of the fuel cell 100. In some embodiments, a reaction chamber 129 has an average interior diameter in a range of 6-20 cm, and an average exterior diameter in a range of 10-40 cm.

A photo-current density obtained from the fuel cell 100 may vary in proportion to the volume of the reaction chamber. For instance, the photo-current density from about 0.1 milliwatts per cubic centimeter ($mW/cm^3$) to about 0.3 $mW/cm^3$ can be obtained when 10 milligrams per milliliter (mg/mL) cyanobacteria is placed in the fuel cell 100.

The fuel cell 100 further includes at least one separator plate provided on each side of the supporting plate 118. Particularly, the fuel cell 100 includes a first separator plate 130 provided between the supporting plate 118 and the cathode 108 and a second separator plate 132 provided between the supporting plate 118 and the anode 106. The first and second separator plates 130, 132 prevent leaks that may occur in the fuel cell environment. The separator plates 126 and 128 and the first and second separator plates 130, 132 are collectively referred to as the 'separator plates' or individually referred to as the 'separator plate' unless otherwise specifically mentioned. In some embodiments, the separator plate is a transparent silicone rubber gasket material.

Figure 2:
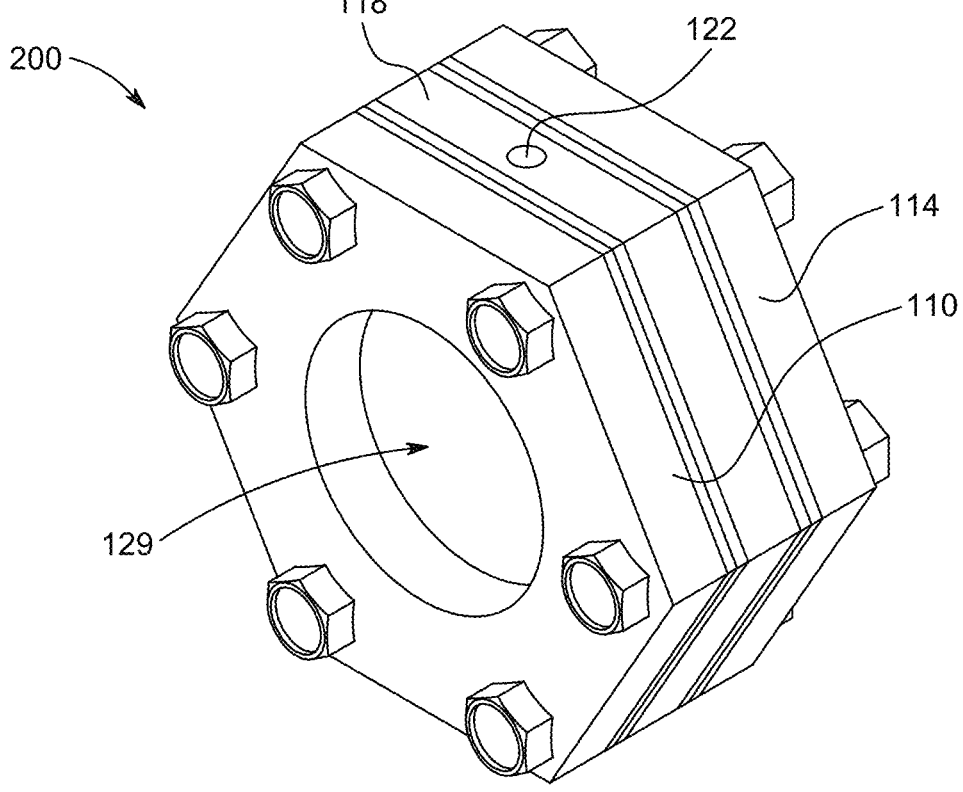
FIG. 2 is an assembled view of the bio-electrochemical fuel cell of FIG. 1, according to certain embodiments of the present disclosure.

The anode 106 is placed between the second endplate 114 and the supporting plate 118. The cathode 108 is placed between the first endplate 110 and the supporting plate 118. The first endplate 110, the supporting plate 118, the second endplate 114 and the separator plates include a plurality of holes 136. The anode 106, the cathode 108, the first endplate 110, the supporting plate 118, the second endplate 114 and the separator plates are connected together to form a fuel cell assembly 200 as shown in FIG. 2. In some embodiments, the first endplate 110, the supporting plate 118, the second endplate 114 and the separator plates are connected together via fastening mechanisms such as nuts, bolts, threads, and snap-fits to form the fuel cell assembly 200. As shown in FIG. 2, the fuel cell assembly 200 may be coupled using a plurality of bolts and nuts.

In some embodiments, the fluid is received by the inlet 122.

In an embodiment, the inlet 122 has an average diameter in a range of 10 to 50 mm, preferably 10 to 40 mm, preferably 10 to 30 mm, preferably 10 to 25 mm, preferably 10 to 20 mm.

Application of the light to the fuel cell assembly 200 causes the photosynthetic microorganisms to release oxygen at the anode 106 and induces a photo-current in the anode 106.

In some embodiments, sizes, operational parameters and physiological variables of the fuel cell 100 may affect output power and voltage. In some embodiments, an open-circuit voltage (OCV) of the fuel cell 100 may vary between 0.05 volts (V) and 0.3 V. As used herein, the term OCV may refer to the difference of electrical potential between two terminals of a device when disconnected from a circuit. In some embodiments, values of the current may be varied by changing a distance between the anode 106 and the cathode 108.

According to a second aspect, the present disclosure relates to a wearable device comprising the fuel cell of the first aspect.

In some embodiments, a wearable device having the fuel cell 100 is illustrated. The wearable device may include, but are not limited to, a smart ring, a smart watch, a smart wristband such as a fitness tracker, augmented reality (AR)

headsets, and mixed reality (MR) headsets. The fuel cell 100 is electrically connected to a sensor of the wearable device. Particularly, the fuel cell 100 functions as a battery to supply enough electric power for the functioning of the sensor and hence the functioning of the wearable device.

According to a third aspect, the present disclosure relates to an electronic device comprising the fuel cell of the first aspect.

In some embodiments, the light-emitting diode device may contain one or more light emitting devices containing a material selected from the group consisting of gallium arsenide (GaAs), gallium arsenide phosphide (GaAsP), aluminium gallium arsenide phosphide (AlGaAsP), gallium phosphide (GaP), and aluminium gallium phosphide (AlGaP). The fuel cell 100 is electrically connected to a light-emitting diode of the light-emitting diode device. The fuel cell 100 functions as a battery to supply enough electric power for the functioning of the light-emitting diode and hence the functioning of the light-emitting diode device. In some embodiments, a fuel cell assembly includes 2 to 10 of the fuel cells 100 which are connected in parallel and/or in series. In some embodiments, the fuel cells 100 are connected in series to achieve higher currents. In some embodiments, the fuel cells 100 are connected in parallel to form a combined fuel cell.

EXAMPLES

Figure 3:
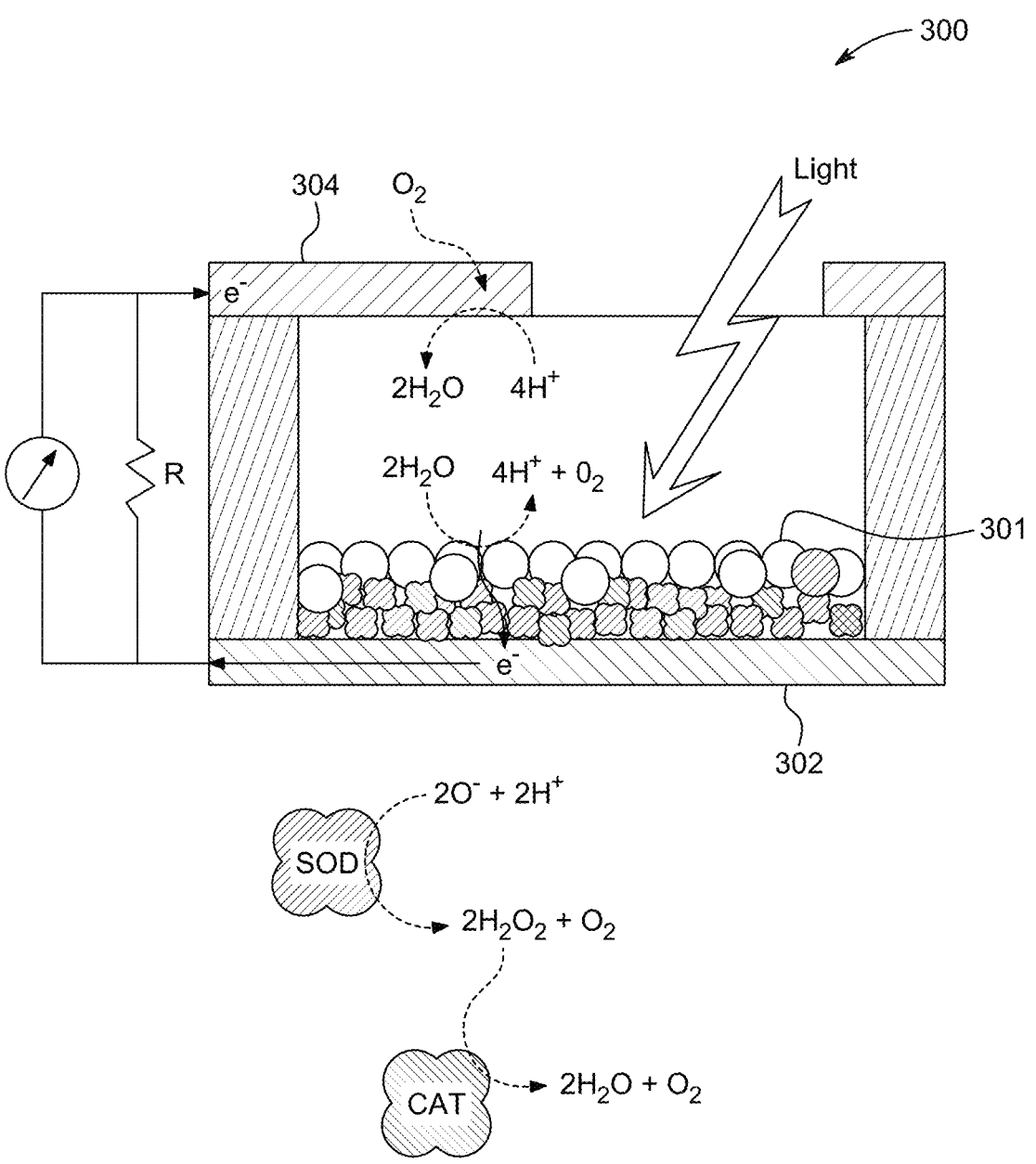
FIG. 3 is a schematic view of a working mechanism of the bio-electrochemical fuel cell, according to certain embodiments of the present disclosure.

The following examples describe and demonstrate exemplary embodiments of the fuel cell 100 described herein. The examples are provided solely for the purpose of illustration and are not to be construed as limitations of the present disclosure, as many variations thereof are possible without departing from the spirit and scope of the present disclosure. Manufacturing and Working Mechanism of the Fuel Cell FIG. 3 illustrates a working mechanism of an exemplary fuel cell 300, according to an embodiment of the present disclosure. The fuel cell 300 generates electricity using photosynthetic microorganisms 301. An anode 302 provides longtime photo-current by destroying reactive organic species 20 (ROS) that are released during photosynthesis. Superoxide dismutase and catalase enzymes (CAT) are immobilized on an anode surface to obtain a functional electrode. Such enzymes maintain the continuity of an electric energy and prevent oxidative stresses from occurring in the fuel cell 300. The ROS may damage photosynthetic environment (proteins and other active substances), causing loss of yield and destruction. The superoxide dismutase and catalase enzymes break down the ROS and such damage is minimized.

A cathode 304 is placed in the fuel cell 300 without the use of a reducing enzyme (carbon or platinum as the material). In addition, bilirubin oxidase bound cathode, which is an oxygen-reducing enzyme, can also be used. The photosynthetic microorganisms 301 are placed on the surface of the anode 302 to form a biofilm. Photo-current, which is activated by photosynthesis by applying a light to the fuel cell 300, is provided by direct electron transfer. The oxygen that is released with the photosynthesis on the anode surface is reduced back to the water by the cathode 304, and the photo-current production in the fuel cell 300 is continuously maintained.

Working mechanism of the fuel cell 100 is also similar to the working mechanism of the fuel cell 300, which is considered as a different embodiment of the fuel cell 100 only for the illustration purpose of the present disclosure.

According to the present disclosure, the fuel cell 100 supplies continuous electricity more efficiently. Easily available photosynthetic microorganisms are used as a source of the electricity. The electricity produced by the fuel cell 100 can be used in biological systems or as a battery and can be used for various purposes such as for the wearable devices and light-emitting diode device. The fuel cell 100 includes an ergonomic structure which can be easily assembled. The fuel cell 100 can be connected in series to increase the power output. The fuel cell 100, according to the present disclosure, is a high-efficient fuel cell that may come into play with a combination of several components that can be readily obtained. Furthermore, there is no separating membrane used within the fuel cell 100 for the electricity generation. Hence, the fuel cell 100 can be miniaturized or designed in large scale. The photo-current produced based on photosynthesis can be stored and used to power a device.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A bolt fastened fuel cell assembly, comprising:
a transparent glass anode;
a cathode;
a first endplate including a central aperture;
a second endplate opposite the first endplate, the second endplate including a central aperture;
a supporting plate between the first endplate and the second endplate, the supporting plate including a central aperture;
at least one first separator plate provided between the first endplate and the cathode; and
at least one second separator plate provided between the second endplate and the anode,
wherein;
the anode is between the second endplate and the supporting plate,
the cathode is between the first endplate and the supporting plate,
a first layer is directly on the anode and comprises at least one enzyme selected from the group consisting of superoxide dismutase and catalase enzyme, the at least one enzyme being entrapped in an enzyme immobilization material comprising a hydrophobically modified polysaccharide having a micellar or inverted micellar structure,
a biofilm comprising photosynthetic microorganisms selected from the group consisting of green algae, cyanobacteria, and combinations thereof is present directly on a surface of the first layer of the anode, the anode, the cathode, the first endplate, the supporting plate, the second endplate and the first and second separator plates are connected together by bolts fitted through the separator plates to form the fuel cell assembly,
the central aperture of the first endplate receives a flow of water containing photosynthetic microorganisms selected from the group consisting of green algae, cyanobacteria, and combinations thereof;
the central aperture of the second endplate discharges the flow of water, wherein an application of light to the fuel cell assembly causes the biofilm to release oxygen at the anode and induces a photo-current in the anode, and
the fuel cell assembly does not include an ion selective membrane between the anode and the cathode.

2. The fuel cell assembly of claim 1, having a planar structure.

3. The fuel cell assembly of claim 1, wherein the fuel cell assembly has a hexagonal shape, a reaction chamber having an average interior diameter in a range of 6-200 cm, and an average exterior diameter in a range of 10-400 cm.

4. The fuel cell assembly of claim 3, wherein the reaction chamber has an average interior diameter in a range of 6-150 cm, and an average exterior diameter in a range of 10-300 cm.

5. The fuel cell assembly of claim 1, wherein one or more of the first and second separator plates is a transparent silicone rubber material.

6. The fuel cell assembly of claim 1, wherein the anode comprises a conductive transparent glass coated with indium tin oxide.

7. The fuel cell assembly of claim 1, wherein the cathode comprises a carbon material or platinum.

8. The fuel cell assembly of claim 7, wherein the carbon material is at least one selected from the group consisting of activated carbon, reduced graphene oxide, graphite, carbon felt, carbon foam, carbon paper, carbon brush, carbon cloth, carbon black, carbon powder, carbon nanofibers, carbon fiber, single-walled carbon nanotubes, double-walled carbon nanotubes, multi-walled carbon nanotubes, carbon nanotube arrays, diamond-coated conductors, glass carbon, mesoporous carbon, uncompressed graphite worms, delaminated purified flake graphite, polycrystalline graphite, and pyrolytic graphite.

9. The fuel cell assembly of claim 1, wherein the cathode comprises at least one enzyme selected from the group consisting of laccase, cytochrome C oxidase, superoxide dismutase, bilirubin oxidase, and peroxidase.

10. The fuel cell assembly of claim 9, wherein the cathode has a layer of bilirubin oxidase.

* * * * *